UNITED STATES PATENT OFFICE.

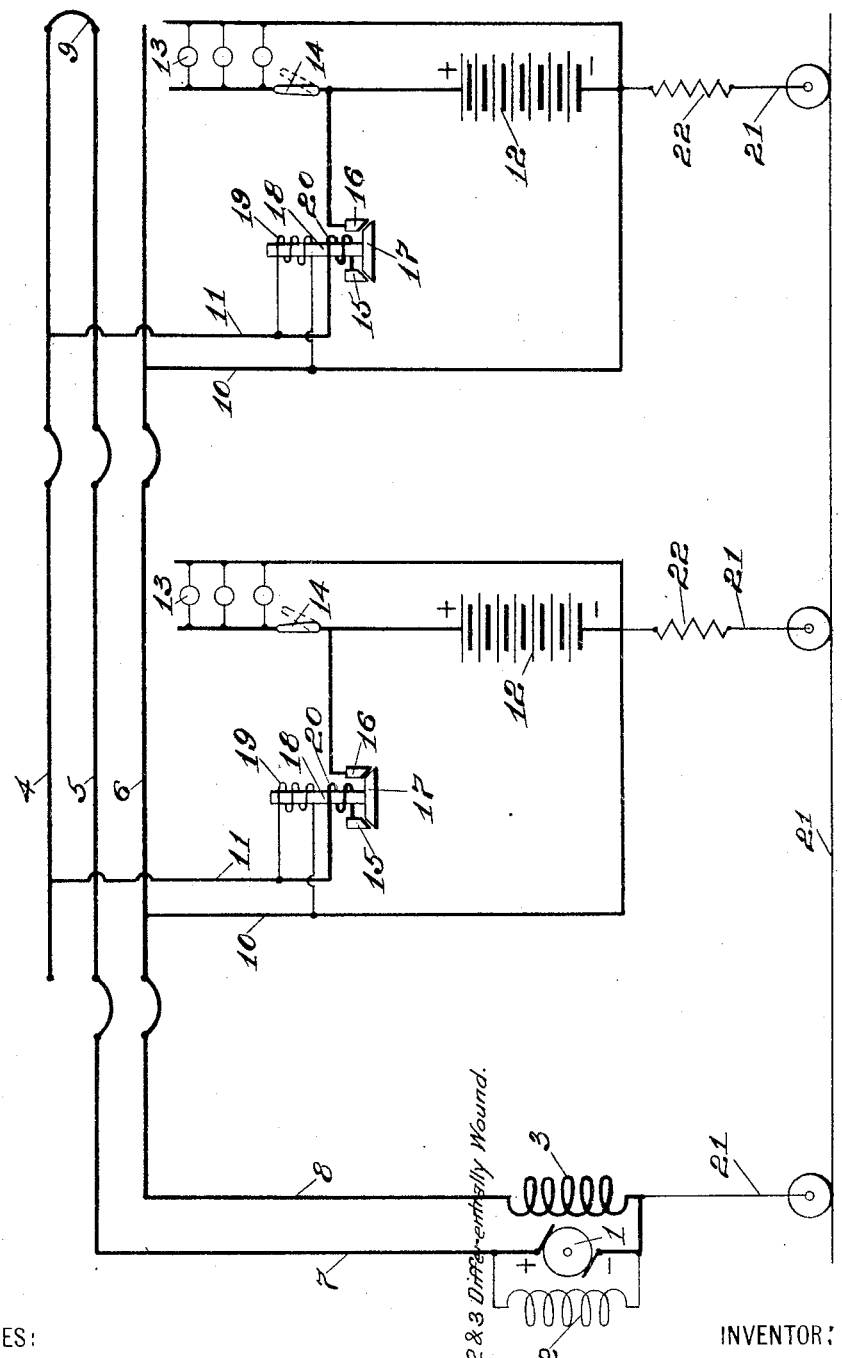

WILLIAM L. BLISS, OF BROOKLYN, NEW YORK, ASSIGNOR TO BLISS ELECTRIC CAR LIGHTING COMPANY, OF MILWAUKEE, WISCONSIN, A CORPORATION OF WISCONSIN.

TRAIN-LIGHTING SYSTEM.

No. 799,524.     Specification of Letters Patent.     Patented Sept. 12, 1905.

Application filed March 15, 1905. Serial No. 250,250.

*To all whom it may concern:*

Be it known that I, WILLIAM L. BLISS, a citizen of the United States, residing at Brooklyn, in the county of Kings and State of New York, have invented new and useful Improvements in Train-Lighting Systems, of which the following is a full, clear, concise, and exact description, reference being had to the accompanying drawing, forming a part of this specification.

The present invention relates to improvements in lighting systems which are especially adapted to be employed for lighting cars or other units of transportation by electricity.

The particular form of the system to which the present invention especially relates is adapted to be employed for lighting a train of cars. It is provided with a single generator, which furnishes the current for operating the entire system. It is also provided with storage batteries and translating devices arranged in circuit with said generator, a storage battery and translating devices being carried upon each car or unit in the train. The generator is driven by an axle or other means, and it is automatically regulated to confine the output thereof within safe limits notwithstanding the wide variations in speed to which it is subjected.

The present application sets forth and claims a modification of an invention which is explained in an application filed June 15, 1904, Serial No. 212,593.

According to the present invention the generator is provided with a field-winding which regulates the same to confine the output thereof within safe limits, said winding being arranged in circuit where it will be subjected to variations in current upon variations in the speed of the generator. The current which it is necessary for the generator to supply depends upon the number of cars or units in the train. If cars be added to the train, the current must increase, and if cars be taken therefrom it must decrease. If the field-winding which regulates the generator be subjected to variations in current under such circumstances, then it will alter the regulation of the generator, thereby preventing said generator from making the output thereof commensurate with the demands for current. The purposes of said field-winding will be attained if it responds to merely such variations in current as result from variations in the speed of the generator.

It is the object of the present invention to provide means which will prevent the regulating-winding of the generator from altering the regulation of the generator when variations in the output of the generator result from changes in the number of cars or units in the train.

The accompanying drawing illustrates a system which will be explained for the purpose of describing the present invention. It will of course be understood that the system illustrated in the drawing may be changed in many ways without departing from the invention and, furthermore, that said drawing illustrates merely sufficient features of the system to characterize the invention.

The generator may be provided with an armature 1, a shunt field-winding 2, and a differential series field-winding 3, and it is preferably arranged upon the tender of the locomotive; but it may be arranged elsewhere upon the train. The armature is preferably geared to the axle, and in consequence it is driven at a variable speed. The shunt-winding 2 preferably produces the initial excitation of the field of the generator, and the differential series field-winding 3 regulates the generator to confine the output thereof within safe limits. When the output of the generator increases, the strength of the current in the regulating field-winding 3 will increase, thereby causing the strength of the field to decrease, and when the output of the generator decreases, the strength of the current in the regulating-winding will decrease, thereby causing the strength of the field to increase, due to the fact that the differential regulating field-winding 3 opposes the shunt field-winding 2, the latter always predominating. The field strength of the generator will thus be varied inversely as the speed of the armature varies, and in consequence the output of the generator will be confined within prearranged limits. The train is preferably provided with a train-line or main circuit which extends through the cars or units thereof, said train-line preferably being composed of conductors 4, 5, and 6. The conductors 5 and 6 are preferably connected to the generator at the forward end of the train by the conductors or supply-mains 7 and 8, and the conductors 4 and 5 are preferably connected to each other at the rear end of the train by a conductor or jumper 9.

The equipment which is installed upon each car will now be explained. The drawing illustrates equipments for two cars, and as both equipments are alike reference will be made to a single car in explaining the same.

The car is provided with a local circuit composed of conductors 10 and 11, the conductor 10 being connected to the conductor 6 and the conductor 11 being connected to the conductor 4. The local circuit is arranged across the train-line in parallel with the other local circuits in the system. As the length of the circuit between the generator and each local circuit is the same, equal voltages will be impressed upon the local circuits. The car is also provided with a storage battery 12 and lamps and other translating devices 13, said battery and said lamps being arranged in said local circuit in parallel. The lamp-circuit is preferably controlled by a switch 14. The local circuit is preferably controlled by an automatic switch, which may be provided with stationary contacts 15 and 16 and a movable contact 17, said movable contact being adapted to engage said stationary contacts to close the local circuit. The movable contact is preferably carried by a plunger 18, which is actuated by windings 19 and 20 to operate the switch. The winding 19 is preferably arranged across the local circuit between the switch-contacts and the train-line, and the winding 20 is preferably arranged in the local circuit in series with the switch-contacts and the storage battery. The shunt-winding 19 will cause the switch to close whenever the voltage of the generator becomes equal to that of the storage battery. While the automatic switch remains closed the series winding 20 will be energized by current flowing through the local circuit, and so long as the generator sends current through the local circuit the series winding will assist the shunt-winding in keeping the movable contact firmly in engagement with the stationary contacts. Whenever the voltage of the generator falls below that of the storage battery, current will flow backward through the local circuit from said battery, and then the series winding will oppose the shunt-winding, as the polarity thereof will be reversed, thereby causing the switch to open.

When the generator is in operation, current will flow from the positive terminal thereof, through supply-main 7, conductor 5, and jumper 9, to conductor 4, thence through the local circuits, and finally through conductor 6, supply-main 8, and series winding 3 to the negative terminal thereof. If the voltage of the generator be substantially equal to that of the storage battery, the current for operating the lamps will be furnished by the generator and storage battery together; but if it be greater than that of the storage battery the generator will furnish the entire current for operating the lamps and also current for charging the storage battery. It being assumed that the voltage of the generator is greater than that of the storage battery, the current in the local circuit will flow from the local main 11, through the automatic switch, then through switch 14 and lamps 13, and also through storage battery 12, to the local main 10. Inasmuch as the current delivered to the storage battery will depend upon the voltage developed by the generator, it will vary whenever the speed of the generator varies. The current delivered to the storage battery will increase in almost direct proportion to the rise in voltage of the generator above the normal voltage of the storage battery, thereby causing the differential series field-winding 3 to be subjected to considerable variations in current upon slight variations in the speed of the generator. When cars are added to the train, the output of the generator will increase to supply the increase in the demands for current, because new parallel circuits are placed across the main circuit or train-line, and when cars are taken from the train the output of the generator will decrease in accordance with the decrease in the demands for current, because parallel circuits are removed from across the main circuit or train-line. It may be assumed where two cars are in the train, as illustrated in the drawing, that the generator delivers a current of one hundred amperes, a current of fifty amperes being distributed to each car. If a car be added to the train, the output of the generator will increase to one hundred and fifty amperes, and if a car be taken from the train the output of the generator will decrease to fifty amperes. When the generator is inoperative, the storage battery will furnish the current for operating the lamps.

If the field-winding 3 which regulates the generator were subjected to variations in current when the number of cars in the train is changed, it would cause the regulation of the generator to be altered, thereby preventing the generator from varying the output thereof in accordance with the variations in the demands for current. To prevent such result, a shunt-circuit 21 may be extended around said winding from the local circuit of each car, thereby causing current to be diverted from said winding. The shunt-circuit of each car is preferably provided with a resistance 22 to prevent it from short-circuiting the regulating field-winding. The wheels of the cars and the tracks upon which said wheels bear, as well as the conducting-framework of the cars, may constitute parts of each shunt-circuit. It will of course be understood that any form of conductor may be employed to form the shunt-circuits. If a car be added to the train, another shunt-circuit will be provided, thereby increasing the number of parallel shunt-circuits extending around the regulating field-winding, and in consequence the current diverted from said regulating-winding will be increased to such an extent as to prevent said winding from being subjected materially to the increase in the output of the generator, and if a car be taken from the train a shunt-circuit will be removed, thereby decreasing the number of parallel shunt-circuits around the regulating-winding, and in consequence the current diverted from said winding will be decreased to such an extent as to prevent said winding from being subjected materially to the decrease in the output of the generator. The output of the generator may therefore vary whenever cars are added to the train or taken therefrom without causing the regulating-winding to alter the regulation of the generator.

It will be understood that many changes may be made in the system which has been set forth herein without in any way departing from the invention as defined by the claims of this application.

Having thus described the invention, what I claim as new, and desire to secure by Letters Patent, is—

1. In a train-lighting system, in combination, a generator driven at a variable speed, a field-winding arranged upon said generator and regulating the same to confine the output thereof within prearranged limits, said field-winding being arranged in circuit to respond to variations in current, a storage battery and translating devices carried upon each of a plurality of units of the train and arranged in circuit with said generator, and means for preventing said field-winding from altering the regulation of said generator upon variations in the output of said generator resulting from changes in the number of units in the train.

2. In a train-lighting system, in combination, a generator driven at a variable speed, a main circuit extending from said generator, a local circuit arranged upon each of said units of the train and connected to said main circuit, a storage battery and translating devices arranged in each local circuit, a field-winding arranged upon said generator and regulating the same to confine the output thereof within prearranged limits, said field-winding being arranged in said main circuit in series with said storage batteries and translating devices, and means for preventing said field-winding from altering the regulation of said generator upon variations in the output of said generator resulting from changes in the number of units in the train.

3. In a train-lighting system, in combination, a generator driven at a variable speed, a main circuit extending from said generator, a local circuit arranged upon each of said units of the train and connected to said main circuit, translating devices arranged in each local circuit, a field-winding arranged upon said generator and regulating the same to confine the output thereof within prearranged limits, said field-winding being arranged in said main circuit in series with said translating devices and the armature of said generator, and means for preventing said field-winding from altering the regulation of said generator upon variations in the output of said generator resulting from changes in the number of units in the train.

4. In a train-lighting system, in combination, a generator driven at a variable speed and provided with a shunt field-winding, said generator also being provided with a differential series field-winding for regulating the same to confine the output thereof within prearranged limits, a main circuit extending from said generator, a local circuit arranged upon each of said units and connected to said main circuit, a storage battery and translating devices arranged in each local circuit, and means for preventing said differential field-winding from altering the regulation of said generator upon variations in the output of said generator resulting from changes in the number of units in the train.

5. In a train-lighting system, in combination, a generator driven at a variable speed and provided with a shunt field-winding, said generator also being provided with a differential series field-winding for regulating the same to confine the output thereof within prearranged limits, a main circuit extending from said generator and passing through a plurality of units of the train, a local circuit arranged upon each of said units of the train and connected to said main circuit in parallel with the other local circuits, a storage battery and translating devices arranged in each local circuit, and means for preventing said field-winding from altering the regulation of said generator upon variations in the output of said generator resulting from changes in the number of units in the train.

6. In a train-lighting system, in combination, a generator arranged upon the tender of the locomotive and driven at a variable speed, a main circuit extending from said generator, a local circuit arranged upon each of said cars and connected to said main circuit, a storage battery and translating devices arranged in each local circuit, a field-winding arranged upon said generator and regulating the same to confine the output thereof within prearranged limits, said field-winding being arranged in said main circuit in series, and means for preventing said field-winding from altering the regulation of said generator upon variations in the output of said generator resulting from changes in the number of units in the train.

7. In a train-lighting system, in combination, a generator arranged upon the tender of the locomotive and driven at a variable speed, said generator being provided with a shunt field-winding and a differential series field-winding, said differential field-winding being provided to regulate the generator to confine the output thereof within prearranged limits, a main circuit extending from said generator, a local circuit arranged upon each of said cars and connected to said main circuit, a storage battery and translating devices arranged in each local circuit, and means for preventing said field-winding from altering the regulation of said generator upon variations of the output of said generator resulting from changes in the number of cars in the train.

8. In a train-lighting system, in combination, a generator driven at a variable speed, a storage battery and translating devices carried upon each of a plurality of units of the train and arranged in circuit in parallel with said generator, a field-winding arranged upon said generator and regulating the same to confine the output thereof within prearranged limits, said field-winding being arranged in circuit to respond to variations in current, and a shunt-circuit extending from each of said units and passing around said field-winding, whereby the output of said generator may vary upon changes in the number of units in the train without thereby altering the regulation of said generator.

9. In a train-lighting system, in combination, a generator driven at a variable speed, translating devices carried upon each of a plurality of units of the train and arranged in circuit with said generator, a field-winding arranged upon said generator and regulating the same to confine the output thereof within prearranged limits, said field-winding being arranged in circuit to respond to variations in current, and a shunt-circuit extending from each of said units and passing around said field-winding, whereby the output of said generator may vary upon changes in the number of units in the train without thereby causing said field-winding to alter the regulation of the generator.

10. In a train-lighting system, in combination, a generator driven at a variable speed, a main circuit extending from said generator, a local circuit arranged upon each of a plurality of units of the train and connected to said main circuit, translating devices arranged in each local circuit, a field-winding arranged upon said generator and regulating the same to confine the output thereof within prearranged limits, said field-winding being arranged in circuit to respond to variations in current, and a shunt-circuit extending from each local circuit and passing around said field-winding, whereby the output of said generator may vary upon changes in the number of units in the train without thereby causing said field-winding to alter the regulation of the generator.

11. In a train-lighting system, in combination, a generator driven at a variable speed and provided with a shunt field-winding, a differential series field-winding arranged upon said generator and regulating same to confine the output thereof within prearranged limits, a main circuit extending from said generator, a local circuit arranged upon each of said units and connected to said main circuit, a storage battery and translating devices arranged in each local circuit, a parallel shunt-circuit extending from each local circuit to said generator and passing around said differential series field-winding, each shunt-circuit being provided with a resistance, whereby the output of the generator may vary upon changes in the number of units in the train without thereby causing the regulation of said generator to be altered upon variations in the output of said generator resulting from changes in the number of units in the train.

12. In a train-lighting system, in combination, a generator driven at a variable speed and provided with a field-winding for regulating same to confine the output thereof within prearranged limits, said field-winding being arranged in circuit to respond to variations in current, a main circuit extending from said generator and passing through a plurality of units of the train, a parallel local circuit arranged upon each of said units and connected to said main circuit, an automatic switch controlling each local circuit, a storage battery and translating devices arranged in each local circuit, and a parallel shunt-circuit extending from each local circuit to said generator and passing around said field-winding, whereby the output of said generator may vary upon changes in the number of units in the train without thereby causing the regulation of said field-winding to alter the regulation of said generator.

13. In a train-lighting system, in combination, a generator arranged upon the tender of the locomotive and driven at a variable speed, said generator being provided with a field-winding for regulating same to confine the output thereof within prearranged limits, said field-winding being arranged in circuit to respond to variations in current, a main circuit extending from said generator, a local circuit arranged upon each of a plurality of cars, a storage battery and translating devices carried upon each car and connected to said main circuit, and a shunt-circuit extending from each car and passing around said field-winding whereby the output of said generator may vary upon changes in the number of cars in the train without thereby causing the said field-winding to alter the regulation of said generator.

14. In a train-lighting system, in combination, a generator driven at a variable speed and provided with a shunt-field, a main circuit extending from said generator, a local circuit arranged upon each of a plurality of units of the train, a storage battery and translating devices carried upon each of a plurality of units of the train and connected in circuit with said generator in parallel, a differential series field-winding arranged upon said generator and regulating the same to confine the output thereof within prearranged limits, said differential field-winding being arranged in said main circuit in series with said storage batteries and said translating devices, and a parallel shunt-circuit extending from each unit and passing around said differential field-winding, whereby the output of said generator may vary upon changes in the number of units in the train without thereby causing said field-winding to alter the regulation of said generator.

15. In a train-lighting system, in combination, a generator driven at a variable speed and provided with a field-winding for regulating the same to confine the output thereof within prearranged limits, said field-winding being arranged in circuit to respond to variations in current, a main circuit extending from said generator, a train-line connected to said main circuit and passing through a plurality of units of the train, a local circuit arranged upon each of said units and connected to said train-line, a storage battery and translating device arranged in each local circuit, and a shunt-circuit extending from each local circuit and passing around said differential field-winding.

In witness whereof I have hereunto subscribed my name in the presence of two witnesses.

WILLIAM L. BLISS.

Witnesses:
J. N. ROBERTSON,
GEORGE MUELLER.